July 29, 1969 W. H. HANSON 3,458,240

FUNCTION GENERATOR FOR PRODUCING THE POSSIBLE BOOLEAN FUNCTIONS OF n INDEPENDENT VARIABLES

Filed Dec. 28, 1965

INVENTOR

*WILLIAM H. HANSON*

BY Thomas J. Nikolai

ATTORNEY

United States Patent Office 3,458,240

Patented July 29, 1969

3,458,240

FUNCTION GENERATOR FOR PRODUCING THE POSSIBLE BOOLEAN FUNCTIONS OF *n* INDEPENDENT VARIABLES

William H. Hanson, Minneapolis, Minn., assignor to Sperry Rand Corporation, New York, N.Y., a corporation of Delaware Filed Dec. 28, 1965, Ser. No. 517,016
Int. Cl. H03k *19/02*
U.S. Cl. 328—92 3 Claims

ABSTRACT OF THE DISCLOSURE

A switching network for producing any one of the possible Boolean functions of *n* independent variables which comprise a plurality of majority decision logic elements interconnected in such a manner that in going from *n* independent variables to $n+1$ independent variables only one additional logic level of majority decision logic elements is necessitated.

This invention relates to function generators and, more particularly, provides means for generating any one of the $2^{2^n}$ possible Boolean functions of *n* independent variables.

It has been determined that; if the logical function, $$f_{n-1}=\overline{X}_1\#(\ldots)_1\#\ldots\#(\ldots)_m$$

(where $(\ldots)_i$ denotes any logical expression), is representative of an $n-1$ variable function generator, such that for a given set of values $x_1 \ldots x_{n-1}$, of the $n-1$ independent variables, $X_1 \ldots X_{n-1}$, $$\ldots\#(\ldots)_1\#\ldots\#(\ldots)_m$$

reduces to $\ldots\#X_1\#Y_k$ (where $Y_k$ is one of the $2^{n-1}$ function selection signals of the function generator, and $k=2^{n-2}x_1+2^{n-3}x_2+\ldots+x_{n-1}$); then $$f_n=\overline{X}_1\#f_\alpha\#f_\beta$$

is representative of an *n* variable function generator where, $f_\alpha=\overline{X}_n\#(---)_1\#\ldots\#(---)_m$, $(---)_i$ being equivalent to $(\ldots)_i$ with function selections signals, $Y_k$, contained in $(\ldots)_i$ being replaced by, $Y_j$, where $j=2k$ if $k<2^{n-2}$ $j=2k+1$ if $k\geqslant 2^{n-2}$, and $f_\beta=X_n\#(*)_1\#\ldots\#(*)_m$, $(***)_i$ being equivalent to $(\ldots)_i$ with function selection signals, $Y_k$, contained in $(\ldots)_i$ being replaced by, $Y_j$ where $j=2k+1$ if $k<2^{n-2}$ $j=2k$ if $k\geqslant 2^{n-2}$ The effect of this determination is that two slightly modified $n-1$ variable function generators may be combined with a single three input majority logic element utilizing one additional logic level to provide an *n* variable function generator. Further, the resulting *n* variable function generator meets the criterion set forth above for $f_{n-1}$ so that two slightly modified *n* variable function generators designed in accordance with this invention may be combined to form an $n+1$ variable function generator.

There are a variety of logical functions meeting the criterion set forth above which can be utilized in effecting this invention. For example, see "*m*-Out-of-*n* Decision Logic" by Raship appearing in Proceedings of The National Electronics Conference, vol. XIX, 1963.

Figure 1:
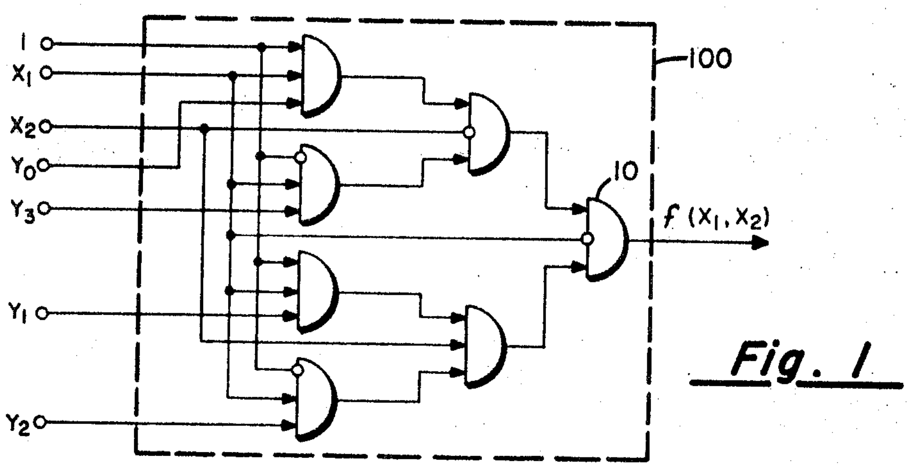
Figure 2:
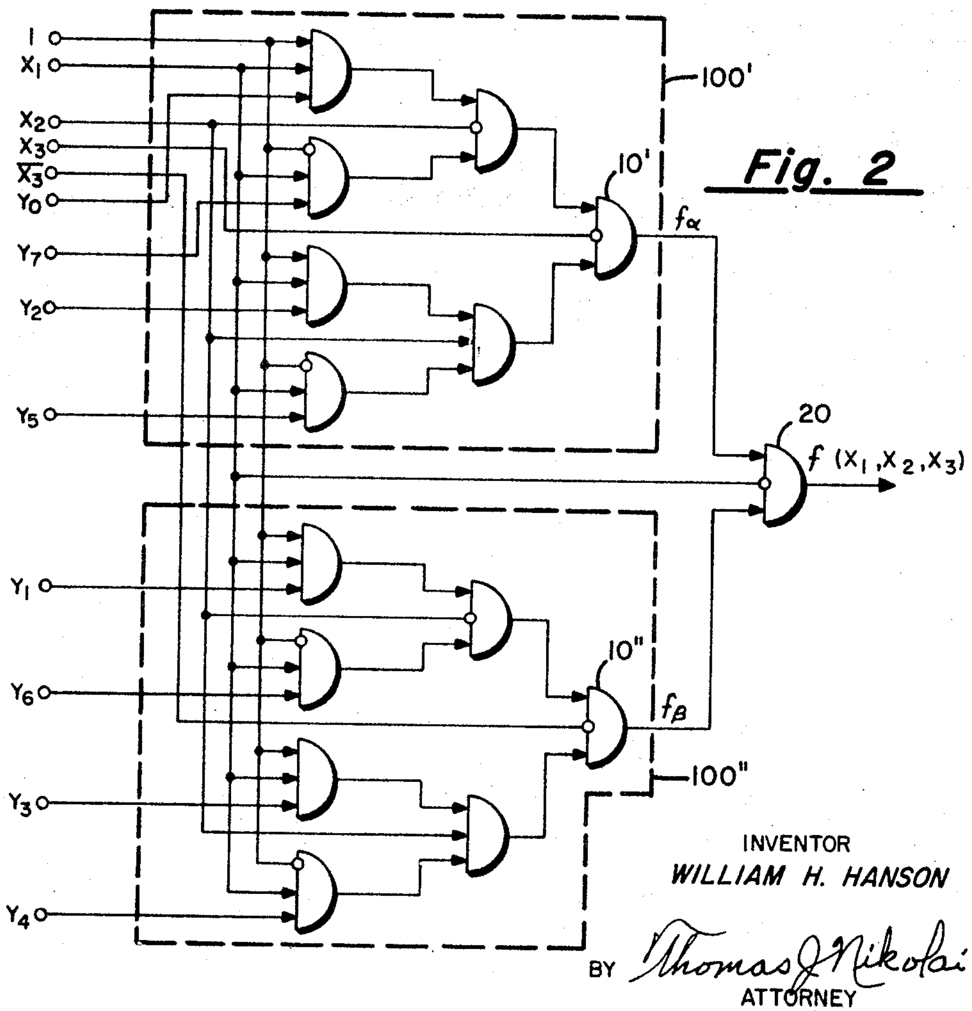

The novel features which are considered characteristic of this invention are set forth with particularity in the appended claims. The invention itself both as to its organization and method of operation, as well as additional advantages thereof, will be best understood from the following example when read in connection with the accompanying drawing, in which:

FIGURE 1 is a logical block diagram of an $n-1$ ($n=3$) variable function generator of the type to be utilized in accordance with this invention; and FIGURE 2 is an example of an $n$ ($n=3$) variable function generator constructed in accordance with this invention utilizing two $n-1$ function generators of the type shown in FIGURE 1.

In the drawing each of the blocks represent a three input majority logic element. Arrowheads indicate direction; each normal arrowhead represents a normal signal; each small circle "arrowhead" represents a negated signal.

With reference now to FIGURE 1 of the drawing, a logical block diagram of a two variable function generator of the type to be utilized with the instant invention is shown. The function generator, designated by the reference numeral 100, for generating a signal representative of, $f(X_1, X_2)$, comprises a network of seven majority logic elements arranged in three logic levels. Function generator 100 receives signal representations of independent variables, $X_1$ and $X_2$, and function selection signals, $Y_0$, $Y_3$, $Y_1$, and $Y_2$ and generates an output signal in accordance with the logical function:

$$f(X_1, X_2)=\overline{X}_1\#[\overline{X}_2\#(X_1\#1\#Y_0)\#(X_1\#0\#Y_3)]\#[X_2\#(X_1\#1\#Y_1)\#(X_1\#0\#Y_2)]$$

The logical function, $f(X_1, X_2)$, is representative of the two variable function generator shown in FIGURE 1. The function, $f(X_1, X_2)$, is such that, $$\ldots\#[\overline{X}_2\#(X_1\#1\#Y_0)\#(X_1\#0\#Y_3)]\#[X_2\#(X_1\#1\#Y_1)\#(X_1\#0\#Y_2)]$$

reduces to $\ldots\#X_1\#Y_k$ for each member of the set of all possible values of the two independent variables, $X_1$ and $X_2$ (the set comprising (0, 0), (0, 1), (1, 0), and (1, 1)). $Y_k$ designates the value of the function corresponding to that number $(x_1, x_2)$ of the above described set for which, $k=2x_1+x_2$. For example, when $X_1=X_2=0$, $$\ldots\#[\overline{X}_2\#(X_1\#1\#Y_0)\#(X_1\#0\#Y_3)]\#[X_2\#(X_1\#1\#Y_1)\#(X_1\#0\#Y_2)]$$

reduces to $\ldots\#X_1\#Y_0$. Similarly, when the independent variables take on the values $X_1=0$ and $X_2=1$, $X_1=1$ and $X_2=0$, and $X_1=1$ and $X_2=1$, $$\ldots\#[\overline{X}_2\#(X_1\#1\#Y_0)\#(X_1\#0\#Y_3)]\#[X_2\#(X_1\#1\#Y_1)\#(X_1\#0\#Y_2)]$$

reduces to $\ldots\#X_1\#Y_1$, $\ldots\#X_1\#Y_2$, and $$\ldots X_1\#Y_3$$

respectively.

The values of the function selection signals, $Y_k$, corresponding to a particular function are easily determined. Function selection signals corresponding to assignments of values to the independent variables for which the function takes the value "one" are assigned the value "one" and those corresponding to assignments of values to the independent variables for which the function takes the value "zero" are assigned the value "zero." For example, if, $$X_1 \wedge X_2$$

(the exclusive-OR function) is the function to be generated, then obviously $Y_0=Y_3=0$ and $Y_1=Y_2=1$.

With reference now to FIGURE 2 of the drawing, a logical block diagram of a three variable function generator designed in accordance with this invention is shown. The three variable function generator comprises two slightly modified two variable function generators designated by reference numerals 100′ and 100″, arranged in parallel and coupled to majority logic element 20. The three variable function generator receives signal representations of independent variables, $X_1$, $X_2$, and $X_3$ and function selection signals $Y_0$, $Y_7$, $Y_2$, $Y_5$, $Y_1$, $Y_6$, $Y_3$, and $Y_4$ and generates an output signal in accordance with the logical function;

$$f_3=\overline{X}_1\#f_\alpha\#f_\beta$$

A signal representative of, $$f_\alpha=\overline{X}_3\#[\overline{X}_2\#(X_1\#1\#Y_0)\#(X_1\#0\#Y_7)]\#[X_2\#(X_1\#1\#Y_3)\#(X_1\#0\#Y_4)]$$

is generated by the network designated by reference numeral 100′. Network 100′ is substantially identical with network 100 with the exception of an input signal representation received by the element from which the output signal is derived (i.e.: element 10′) and function selection signals, $Y_j$. The input signal representation of $\overline{X}_1$ received by element 10 of network 100 is replaced by a signal representation of $\overline{X}_3$ when received by element 10′ of network 100′. Function selection signals, $Y_k$, of network 100 are transformed to function selection signals, $Y_j$, of network 100′ by the following transformation:

$$j=2k \text{ if } k<2 \text{ and}$$
$$j=2k+1 \text{ if } k\geqslant 2$$

Hence, $Y_0\rightarrow Y_0$, $Y_1\rightarrow Y_2$, $Y_2\rightarrow Y_5$, and $Y_3\rightarrow Y_7$.

A signal representative of, $$f_\beta=X_3\#[\overline{X}_2\#(X_1\#1\#Y_1)\#(X_1\#0\#Y_6)]\#[X_2\#(X_1\#1\#Y_3)\#(X_1\#0\#Y_4)]$$

is generated by the network designated by reference numetal 100″. Network 100″ is substantially identical with network 100 with the exception of an input signal representation received by the element from which the output signal is derived (i.e.: element 10″) and function selection signals, $Y_j$. The input signal representation of $\overline{X}_1$ received by element 10 of network 100 is replaced by a signal representation of $X_3$ when received by element 10″ of network 100″. Function selection signals, $Y_k$, of network 100 are transformed to function selection signal, $Y_j$ of network 100″ by the following transformation:

$$j=2k+1 \text{ if } k<2 \text{ and}$$
$$j=2k \text{ if } k\geqslant 2$$

Hence, $Y_0\rightarrow Y_1$, $Y_1\rightarrow Y_3$, $Y_2\rightarrow Y_4$, and $Y_3\rightarrow Y_6$.

Element 20 receives signal representations of $f_\alpha$, $f_\beta$, and $\overline{X}_1$ and generates an output signal in accordance with the logical function:

$$f(X_1, X_2, X_3)=\overline{X}_1\#f_\alpha\#f_\beta$$

The values of the function selection signals, $Y_j$, corresponding to a particular function are easily determined. Function selection signals corresponding to assignment of values to the independent variables for which the function takes the value "one" are assigned the value "one,"

and those corresponding to assignments of values to the independent variables for which the function takes the value "zero" are assigned the value "zero." For example, if $(X_1\cdot X_2)+X_3$, is the function to be generated, then obviously $Y_1=Y_3=Y_5=Y_6=Y_7=1$ and $Y_0=Y_2=Y_4=0$.

The example shown in the drawing and described above (i.e.: with $n=3$) is to be construed as exemplary only and not limitative. It is understood that suitable modifications may be made in the structure as disclosed provided such modifications come within the spirit and scope of the appended claims.

Having now, therefore, fully illustrated and described my invention, what I claim to be patentably novel and desire to protect by Letters Patent is:

1. A function generator, for generating a signal representative of $f_n$ where $f_n$ is any one of the $2^{2^n}$ Boolean functions of $n$ independent variables $X_1, X_2 \ldots X_n$, comprising:

input means for receiving signal representations of independent variables $X_1, X_2 \ldots X_n$ and $2^n$ function selection signals, $Y_j$, and means coupled to said input means for utilizing said independent variable signal representations and said function selection signals to generate an output signal representative of $f_n$ in accordance with the logical function, $$f_n=\overline{X}_1\#f_\alpha\#f_\beta$$

2. A function generator as defined in claim 1 in which said generating means comprises:

a first network coupled to said input means for generating a signal representative of $f_\alpha$ in accordance with the logical function $$f_\alpha=\overline{X}_n\#(\text{ - - - })_1\#\ \ldots\ \#(\text{ - - - })_m$$

and a second network coupled to said input means for generating a signal representative of $f_\beta$ in accordance with the logical function $$f_\beta=X_n\#(\ *\ *\ *\ )_1\#\ \ldots\ \#(\ *\ *\ *\ )_m$$

3. A function generator as defined in claim 2 in which said generating means further comprises a three input majority logic element coupled to said input means, said first network, and said second network for utilizing signal representations of $\overline{X}_1$, $f_\alpha$, and $f_\beta$ to generate an output signal representative of $f_n$.

References Cited

UNITED STATES PATENTS 3,201,701 8/1965 Maitra ---------- 307—204 X

OTHER REFERENCES

Smith et al.: I.B.M. Technical Disclosure Bulletin, vol. 6, No. 4, September 1963, pp. 67–68.

DONALD D. FORRER, Primary Examiner

U.S. Cl. X.R.

307—203, 207, 211, 215, 216, 218; 328—93, 94